United States Patent [19]

Aristarkhov et al.

[11] 3,943,365
[45] Mar. 9, 1976

[54] METHOD OF DETECTING STACKS WITH LEAKY FUEL ELEMENTS IN LIQUID-METAL-COOLED REACTOR AND APPARATUS FOR EFFECTING SAME

[76] Inventors: Nikolai Nikolaevich Aristarkhov; Igor Alexandrovich Efimov, both of prospekt Lenina, 24, kv. 30, Obninsk, Kaluzhskoi oblasti; Boris Ivanovich Zaitsev, ulitsa Shalyapina, 15, kv. 131, Gorky; Iskra Genrikhovna Peters, ulitsa Maximova, 6, kv. 78, Moscow; Boris Severianovich Tymosh, prospekt Lenina, 13/1, kv. 25, Obninsk, Kaluzhskoi oblasti; Viktor Sergeevich Filonov, ulitsa Raspletina, 1, kv. 19, Moscow; Alexei Lavrentievich Sharov, Tramvainy proezd, 17, korpus 1, kv. 133, Moscow; Alexei Ivanovich Shildin, ulitsa Pravdy, 3/1, kv. 36, Moscow; Galina Stepanovna Balashova, ulitsa Demyana Bednogo, 1, korpus 6, kv. 27, Moscow; Nikolai Ivanovich Bets, prospekt Lenina, 29, kv. 56, Obninsk, Kaluzhskoi oblasti; Stanislav Alexandrovich Skvortsov, ulitsa Kurchatova, 19, kv. 104, Obninsk, Kaluzhskoi oblasti; Valentina Stepanovna Yakovleva, Leningradskoe shosse, 88, kv. 94, Moscow; Ivan Ilich Zhuchkov, ulitsa 22 Partsezda, 6/2, kv. 60., Gorky; Vladimir Sergeevich Gorjunov, ulitsa Shalyapina, 15, kv. 124, Gorky; Vladimir Alexeevich Petrov, ulitsa Zhitomirskaya, 9-a, kv. 18, Gorky; Vladimir Petrovich Kevrolev, ulitsa Goncharova, 3, kv. 34; Valery Nikolaevich Rybakov, ulitsa Lenina, 10, kv. 61, both of Dimitrovgrad, Ulyanovskoi oblasti; Ninel Dmitrievich Tverdovsky, 1 Mikroraion, 31, kv. 37, Shevchenko, Mangyshlakskoi oblasti, all of U.S.S.R.

[22] Filed: Oct. 23, 1973

[21] Appl. No.: 408,934

[52] U.S. Cl. ............................... 250/390; 250/391
[51] Int. Cl.² ......................................... G01T 3/00
[58] Field of Search .................. 250/390, 391, 392; 176/19 LD

[56] References Cited
UNITED STATES PATENTS

| 3,197,377 | 7/1965 | Ohlinger | 250/390 X |
|---|---|---|---|
| 3,733,249 | 5/1973 | Miller et al. | 176/19 LD |

Primary Examiner—Davis L. Willis
Attorney, Agent, or Firm—Haseltine, Lake & Waters

[57] ABSTRACT

A method of detecting stacks with leaky fuel elements in a liquid-metal-cooled reactor, consisting in that prior to withdrawing a coolant sample, gas is accumulated in the coolant of the stack being controlled, the reactor being shut down, separated from the sample by means of an inert carrier gas, and the radioactivity of the separated gas is measured. An apparatus for carrying out said method comprises a sampler in the form of a tube parallel to the reactor axis in the hole of a rotating plug and adapted to move along the reactor axis. Made in the top portion of the tube are holes for the introduction of the inert carrier gas and the removal thereof together with the gases evolved from the coolant, while the bottom portion of the tube is provided with a sealing member.

10 Claims, 4 Drawing Figures

METHOD OF DETECTING STACKS WITH LEAKY FUEL ELEMENTS IN LIQUID-METAL-COOLED REACTOR AND APPARATUS FOR EFFECTING SAME

The present invention relates to nuclear engineering, and more particularly to a method of detecting stacks with leaky fuel elements in a liquid-metal-cooled reactor and an apparatus for carrying out this method.

Known in the art are methods of detecting stacks with leaky fuel elements in a liquid-metal-cooled reactor and apparatus for effecting same.

In a prior art method of detecting stacks with leaky fuel elements in a liquid-metal-cooled reactor, fuel element stacks are successively checked after they are transferred, one by one, from the reactor core into a special test chamber filled with an inert carrier gas. Then, radioactive gases evolving from leaky fuel elements are accumulated in the inert carrier gas, their radioactivity is measured, and the inert carrier gas is sampled together with the gases evolved the faulty stacks. Whether a fuel element is leaky or not is determined by the degree of activity of the gas samples. After stacks with leaky fuel elements have been detected, they are removed from the reactor core and stacks with leakproof fuel elements are recharged therein.

An apparatus for carrying out the above method is known, comprising a sampler in the form of a test chamber the top and bottom portions whereof accomodate tubes for introducing an inert carrier gas and removing it together with the gases evolved from leaky fuel elements. The inner space of the chamber communicates with a means for measuring the radioactivity of the inert carrier gas mixed with the gases evolved from leaky fuel elements.

A disadvantage of said method of detecting stacks with leaky fuel elements and the apparatus carrying out this method resides in that it takes too much time to check one fuel element stack, since a check comprises the steps of removing a fuel element stack from the reactor core, accumulating evolving gases in the inert carrier gas, measuring the radioactivity of the evolved gases and recharging the stack into the core; on the whole, it takes several hours to complete a check.

Another disadvantage of the above method and apparatus is that such a check results in a prolonged shut-down of the reactor, for removing fuel element stacks, checking them and recharging new ones can only be done in a shut-down reactor, which, as has been already mentioned, is time-consuming and economically impractical.

Still another disadvantage of the above method and apparatus is that the fuel element stack checking procedure may result in contamination of the stack discharge zone with nuclear fuel if the shell of the leaky element being removed is cracked, which is inconsistent with safety regulations.

The above method and apparatus suffer from yet another disadvantage which resides in a possibility of a fuel element's meltdown in the stack under the action of an intensive afterheat.

Another method of detecting stacks with leaky fuel elements is known, this time without shutting down the reactor, also consisting in successive checking of fuel element stacks by withdrawing coolant samples from the stack being controlled, separating gas from a sample by means of an inert carrier gas, and measuring the radioactivity of the resulting gas mixture. In this case, the inert carrier gas is injected under pressure into the coolant at the outlet of each stack, mixed with the sampled coolant and the resulting mixture in the form of an emulsion is degassed, and the evolved gases are removed from the reactor. Checking is done without removing fuel element stacks from the reactor core, and stacks with leaky fuel elements are detected by measuring the radioactivity of the resulting gas mixture.

An apparatus is known for carrying out the latter method and designed for operation in a widely known reactor provided with a recharging mechanism with a guide tube movable with the aid of a drive and two rotating plugs. One of the rotating plugs has at least one hole and is arranged internally of the other. The apparatus comprises a sampler for withdrawing samples from each individual fuel element stack, made in the form of a plurality of tubes the number thereof corresponds to that of the fuel element stacks to be controlled in the reactor core, with an inert carrier gas being fed under pressure from a source into each sampler tube and the inner space of the sampler communicating with a means for measuring the radioactivity of the inert carrier gas from the sampler mixed with the gases evolved from a coolant sample.

The coolant sample is degassed inside the sampler tubes communicating with a collector in which the inert carrier gas is accumulated together with gases evolving from the coolant sample.

This apparatus for detecting stacks with leaky fuel elements, however, suffers from a disadvantage residing in the complexity of its structure which comprises a sampler with a multitude of tubes, disposed inside the reactor, a collector and a special distributing device for introducing the inert carrier gas under pressure successively into each sampler tube, as well as means for introducing the inert carrier gas into the sampler tubes and removing it from the collector. Such a structure renders the recharging and rearrangement of fuel element stacks in the core in the usual manner impossible, and mounting and dismantling of the whole apparatus is too labour-consuming. All this substantially complicates the reactor maintenance and requires additional time. Besides, in addition to consuming too much time, the dismantling procedure involves risks of exposure to radioactive matter contaminating the equipment inside the reactor.

It is an object of the present invention to provide a method of detecting stacks with leaky fuel elements and an apparatus for effecting same, with such sampling facilities that will allow for effecting successive check of fuel element stacks in a shut-down liquid-metal-cooled reactor without withdrawing them from the reactor core and for removing faulty fuel element stacks therefrom.

With this and other objects in view, the invention resides in that the method of detecting stacks with leaky fuel elements by successively checking fuel element stacks comprises the steps of separating a coolant sample from the coolant in the fuel element stack being checked, separating gas from the sample by means of an inert carrier gas and measuring the radioactivity of the separated gas, with gases being accumulated, according to the invention, prior to sampling in the coolant of the fuel element stack being checked with the reactor being shut down.

In a reactor with stationary coolant, the accumulation of gases in the coolant of the fuel element stack being checked should preferably be effected by bringing the reactor to steady-state operating conditions prior to the check within a time period corresponding to the time of convective exchange in the fuel element stack coolant.

In a reactor with circulating coolant, the accumulation of gases in the coolant of the fuel element stack being checked should preferably be effected by stopping the circulation of the coolant in the fuel element stack being checked for a time period limited by the time required for the fuel elements to be heated to a temperature level below critical as far as their integrity is concerned.

The circulation of the coolant in the fuel element stack being checked can most effectively be stopped by means of a counterpressure built up by the inert carrier gas.

It is expedient, with a low afterheat prior to accumulation, to free the fuel element stack being checked from the coolant during a time period determined by the afterheat of the fuel elements and by the time required for their heating to a temperature level below critical as far as their physical, structural or operative integrity is concerned, whereby the process of accumulation of gases in the coolant of the fuel element stack being checked is accelerated.

It is advisable that an apparatus for carrying out the proposed method of detecting stacks with leaky fuel elements in a reactor, provided with a recharging mechanism including a guide tube movable with the aid of a drive and two rotating plugs, one of the plugs, having at least one hole, being arranged internally of the other, should have a sampler for separating coolant samples from the coolant in each individual fuel element stack being checked with the coolant samples being degassed in the inner space thereof, which space communicates with a means for measuring the radioactivity of the inert carrier gas together with the gases evolved from a coolant sample, removed from the sampler, said sampler being made, according to the invention, in the form of a first tube having a plug and being arranged parallel to the reactor axis and adapted to move therealong through the hole in the first rotating plug with the aid of the recharging mechanism drive, with holes being made in the top portion of the tube, which, in the course of operation of the apparatus, is above the rotating plugs, for introducing the inert carrier gas and removing it together with the gases evolved from the coolant, while provided in the bottom portion of the tube is a sealing member for cutting off the flow of coolant from the fuel element stack being checked and making for the accumulation of gases in the coolant under the counterpressure built up by the inert carrier gas.

In a reactor with stationary coolant, the proposed apparatus should preferably have a second tube arranged internally of the firt tube, the first end whereof is passed through the hole for introducing the inert carrier gas, while the second end is disposed in proximity to the cap of the fuel element stack being checked below the level of the coolant in the first tube, a hole being made in the second tube in immediate proximity to an end thereof for introducing the inert carrier gas into the first tube, and at least one hole being made in the wall of the first tube above the fuel element stack and below the coolant level for the coolant to flow from the stack into the first tube.

The second tube may be arranged coaxially with the first tube and movably along the reactor axis until it butts up against the cap of the fuel element stack, thus preventing the first tube from gripping the stack as they are disengaged after the check is over.

In a reactor with forced circulating coolant, the apparatus should most preferably have a third and fourth tubes for introducing the inert gas carrier into the first tube and removing it therefrom, a baffle and a nozzle disposed in the bottom portion of the first tube above the cap of the fuel element stack so that the whole of the coolant from the stack being checked would enter the nozzle and be sprayed above the coolant level in the first tube, while the baffle should be arranged above the nozzle in the top portion of the first tube to provide for additional spraying of the coolant from the nozzle and to prevent the coolant from penetrating the space above the baffle and solidifying therein, the third and fourth tubes being so arranged internally of the first tube that the first end of the third tube is coupled to the hole for removing the inert carrier gas, the first end of the fourth tube is coupled to the hole for removing the inert carrier gas, together with the gases evolved from the coolant, from the first tube, and the second ends of the third and fourth tubes are disposed below the baffle and above the coolant level, while at least one hole may be made in the wall of the first tube below the nozzle and above the fuel element stack for removing the coolant from the first tube.

It is also desirable that the proposed apparatus have a fifth tube disposed in the hole of the first rotating plug and adapted to move along the reactor axis, so that the first tube is arranged internally of the fifth tube the bottom end whereof is disposed above the fuel element stack below the coolant level in the reactor to prevent the first tube from gripping the stack as they are disengaged after the check is over.

The invention will now be described in greater detail with reference to preferred embodiments thereof taken in conjunction with the accompanying drawings, in which.

The method of detecting stacks with leaky fuel elements in a liquid-metal-cooled reactor according to the present invention consists in the following.

In a shut-down reactor, the radioactive gas evolving from leaky fuel elements is accumulated in the coolant of the fuel element stack being checked, a sample of the coolant is separated or isolated from the coolant, the accumulated gas is separated from this sample by means of the inert carrier gas, and the radioactivity of the separated gas is measured; thus, all the fuel element stacks in the reactor core are checked one by one.

The accumulation of gases in the coolant of the fuel element stack being checked is effected, in a shut-down reactor with stationary coolant, by bringing the reactor to steady-state conditions prior to checking. By steady-state conditions we mean a state when such parameters of the reactor as the coolant temperature and coolant level in the reactor vessel are maintained constant, and all operations involving circulation of the coolant in the reactor vessel are eliminated. The steady-state conditions are maintained for a specific period of time corresponding to the time of convective exchange in the coolant of a fuel element stack, which usually amounts to 5 to 15 hours (depending on the amount of afterheat).

In a shut-down reactor with circulating coolant, to accumulate gases in the coolant of the fuel element stack being checked, the circulation of coolant is stoped in the latter. The coolant circulation is stopped for a period of time limited by the time required for the fuel elements in the stack to be heated to a temperature level critical thereof, i.e. to a level up to which fuel-element jackets remain intact. Stopping the coolant circulation is effected by the counterpressure built up by the inert carrier gas.

In case the amount of afterheat in fuel elements is small both with stationary and circulating coolant, to accelerate the process of gas accumulation in the coolant of the fuel element stack being checked, it is most expedient that the stack be freed from the coolant prior to accumulation. The time period for which the fuel element stack being checked is rid of the coolant is determined by the afterheat of the fuel elements in the stack and the time required for their heating to a temperature level permissible for their integrity. Then the coolant is returned to the stack and the process of gas accumulation is commenced. This process is accelerated due to the heating of the fuel elements in the absence of coolant and a more intensive liberation of gas from the heated leaky fuel elements. The stack is freed from the coolant by the counterpressure built up by the inert carrier gas and reduced, during gas accumulation, to a level required to effect this process.

Figures 1, 2:
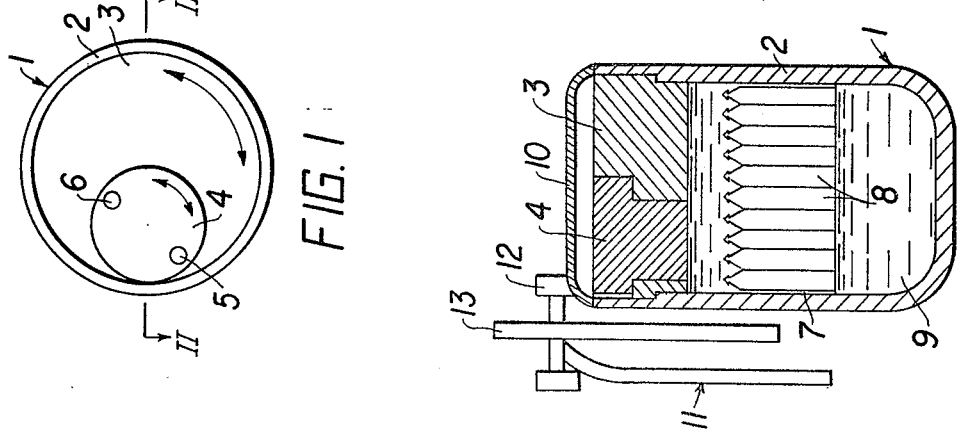
FIG. 1 is a plan view of a liquid-metal-cooled reactor, according to the invention.
FIG. 2 is a section taken along line II—II of FIG. 1.

Referring now to FIG. 1, the reactor 1, used wherein is an apparatus for carrying out the method of the present invention, comprises a vessel 2 with a core disposed under rotating plugs 3 and 4. The plug 4 is arranged internally of the plug 3 and is provided with holes 5 and 6, both plugs being adapted to rotate axially in any sense.

Turning now to FIG. 2, the core 7 of the reactor 1 accomodates fuel element stacks 8 washed by a liquid-metal coolant 9. The reactor 1 also has a lid 10, and disposed externally of the vessel 2 and lid 10 is a recharging mechanism 11 with a drive 12 for moving a guide tube 13 of the recharging mechanism 11. The holes 5 and 6 (FIG. 1) in the plug 4 receive the guide tube 13 (FIG. 2).

The apparatus for detecting stacks with leaky fuel elements used in the reactor 1 with stationary coolant, comprises a main tube 14 (FIG. 3) with a plug 15. The tube 14 is mounted parallel to an axis 16 of the reactor 1 in the hole 5 of the rotating plug 4 and adapted to move axially with the aid of the drive 12 of the recharging mechanism 11 (FIG. 2).

Made in the top portion of the tube 14 (FIG. 3), which, in the course of operation of the apparatus, is disposed above the plugs 3 and 4, are a hole 17 for introducing the inert carrier gas and a hole 18 for removing the inert carrier gas together with the gas evolved from the coolant 9. Disposed in the bottom portion of the tube 14, which, in the course of operation of the apparatus, is under the plugs 3 and 4, is a sealing member 19 for cutting off the flow of the coolant 9 from the fuel element stack 8 and for enabling the accumulation of gases in the coolant 9 of the stack 8 under the counterpressure built up by the inert carrier gas. The inner space of the tube 14 communicates through the hole 18 and a pipe 20 with a means 21 for measuring the radioactivity of the inert carrier gas removed from the tube 14 together with the gases evolved from a sample of the coolant 9, which means is a conventional instrument for measuring concentration of radioactive gases. The apparatus for detecting stacks with leaky fuel elements also comprises a hollow tube 22 arranged internally of the tube 14 so that the first end thereof is passed through the hole 17 for introducing the inert carrier gas, while its second end is disposed in proximity to the cap of the stack 8 below the level B of the collant 9 in the tube 14, C designating the level of the coolant 9 in the reactor 1. A hole 23 is made in the second end of the tube 22 for the inert carrier gas to flow therefrom into the main tube 14. A doser 24 arranged as a conventional gas doser and supplying the inert carrier gas is coupled to the hollow tube 22 via a pipe 25. When a small amount of gas is discharged by the controlled stacks it is, therefore, expedient to accumulate in advance the gas discharged by the stack to the heat carrier under stationary conditions of the shut-off reactor. Made in the wall of the tube 14 above the stack 8 and below the level B of the coolant 9 in the tube 14 and the level C of the coolant 9 in the reactor 1 is a hole 26 for the coolant 9 to flow from the stack 8 being checked into the main tube 14. Any number of holes 26 may be used.

To prevent the tube 14 from gripping the stack 8, as they are disengaged after the check is over, the hollow tube 22 is arranged coaxially therewith and is adapted to move along its axis until it butts up against the cap 27 of the stack 8. The tube 22 can be moved with the aid of any appropriate known means (not shown).

Figure 4:
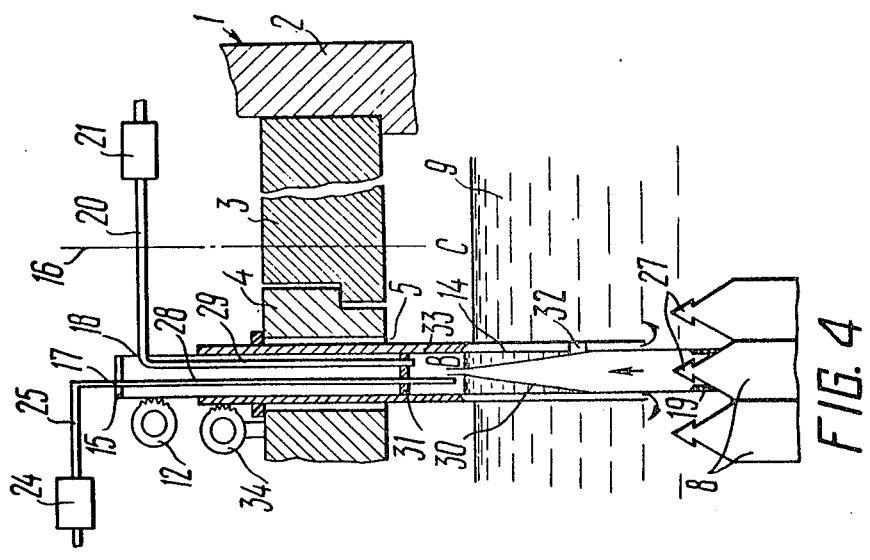
FIG. 4 is an elevation view of another embodiment of the apparatus for detecting stacks with leaky fuel elements in the liquid-metal-cooled reactor, according to the invention.
Figure 3:
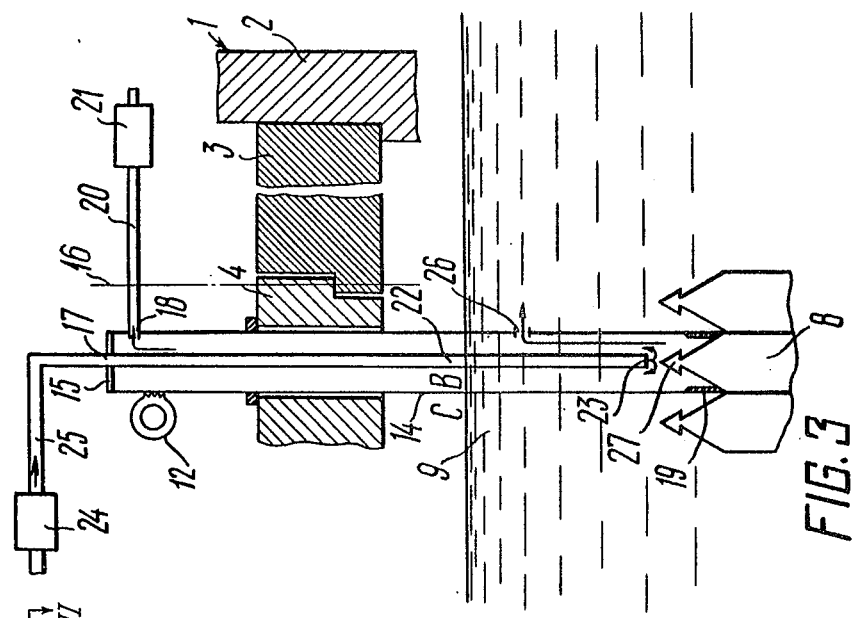
FIG. 3 is an elevation view of an apparatus for detecting stacks with leaky fuel elements in the liquid-metal-cooled reactor, according to the invention.

In contrast to the apparatus of FIG. 3, the apparatus for detecting stacks with leaky fuel elements, shown in FIG. 4, is intended for use in a reactor with forced circulation of the coolant 9. Arranged internally of the tube 14 are two hollow tubes 28 and 29, the tube 28 serving to introduce the inert carrier gas, and the tube 29 serving to remove it from the main tube 14.

Provided in the bottom portion of the main tube 14 is a nozzle 30 disposed above the cap 27 of the stack 8 so that all of the coolant 9 from the stack 8 enters the nozzle 30 and is sprayed above the level B of the coolant 9 in the tube 14. A baffle 31 is arranged above the nozzle 30 to provide for additional spraying of the coolant 9 outgoing from the nozzle 30 and to prevent the coolant 9 from penetrating the space above the baffle 31 and solidifying there. The hollow tube 28 for introducing the inert carrier gas is so arranged that its first end is coupled to the hole 17 for introducing the inert carrier gas, while the hollow tube 29 for removing the inert carrier gas together with the gases evolved from the coolant 9 is so arranged that the first end thereof is coupled to the hole 18 for removing the inert carrier gas together with the evolved gases from the main tube 14. The second ends of the hollow tubes 28 and 29 are disposed below the baffle 31 and above the level B of the coolant 9 in the tube 14. Made in the wall of the main tube 14 above the stack 8 and below the nozzle 30 is a hole 32 for removing the coolant 9 from the main tube 14. Any number of holes 32 can be used.

To prevent the tube 14 from gripping the stack 8, as they are disengaged after the check is over, the apparatus is additionally provided with a tube 33 arranged internally of the hole 5 of the plug 4 so that the main tube 14 is disposed inside the additional tube 33 coaxially therewith. The latter is adapted to move with the aid of a drive 34 along the axis 16 of the reactor 1 and is so arranged that in operation the bottom end thereof is located above the stack 8 being checked and below the level C of the coolant 9 in the reactor 1.

Consider now the operation of the apparatus for detecting stacks with leaky fuel elements, as shown in FIG. 3, in the shut-down reactor 1 with stationary liquid-metal coolant.

Consecutive check of the fuel element stacks 8 is commenced after the reactor 1 is shut down. Therewith, steady-state conditions (steady-state parameters of the reactor 1) are maintained in the reactor 1 prior to the check during a period of time determined by the convective exchange in the coolant 9 of the stack 8. The batters's duration is different for reactors with different characteristics, as well as the time period during which the steady-state conditions are maintained.

By turning the plugs 3 and 4, the tube 14 (FIG. 3) is positioned above a next stack 8 to be checked and is lowered, by means of the drive 12, until the sealing member 19 engages with the stack 8. At that moment, the circulation of the coolant 9 through the stack 8 being checked discontinues. After the tube 14 has been properly positioned on top the stack 8, an inert carrier gas is fed thereto under pressure and at a particular rate from the doser 24 through the pipe 25 and the hollow tube 22. As the inert carrier gas emerges from the hole 23 under a pressure slightly higher than the pressure of the coolant 9 in the tube 14, it makes the coolant 9 bubble in the inner space of the tube, forcing, at the same time, the coolant 9 from the stack 8 to the hole 26 in the wall of the tube 14, wherethrough the coolant 9 flows into the vessel of the reactor 1. The sample is the heat carrier of the controlled stack which circulates, as a result of the process described above, in the inner part of the tube 14 from the stack 8 to the hole 26. The above-described process is referred to as the sampling process. In the course of bubbling, the coolant sample is degassed. The resulting gas mixture goes up to the top portion of the tube 14 and passes through the hole 18 and pipe 20 on to the means 21 for measuring the radioactivity of the gas mixture, with any appropriate instrument for measuring concentration of radioactive gases being used as said means. The radioactivity of the gas mixture is indicative of a leak in the stack 8 being checked.

After a stack 8 has been checked, the drive 12 is used to move the tube 14 up until the sealing member 19 is disengaged from the checked stack 8, and the tube 14 is positioned so that when it is moved to be engaged with another stack 8, it does not touch the cap of the latter.

By moving the main tube 14 in the above manner (with the aid of the drive 12 and by rotating the plugs 3 and 4), all the fuel element stacks disposed in the liquid-metal-cooled reactor core are checked one by one with the radioactivity of the gas from each stack 8 being measured. It is by the degree of radioactivity of said gas that leaky fuel elements are detected in the stack 8 being checked.

In the case of a small amount of afterheat in the shutdown reactor 1 with stationary liquid-metal coolant 9 the freeing of the controlled stack of the heat carrier consists of the following. The tube 14 (used without holes 26) together with the fuel element stack 8 being checked is sealed, and the doser 24 supplies the pressurized inert carrier gas through the pipe 25 into the hollow tube 28, which inert carrier gas forces the coolant 9 out of the stack 8. This state is maintained during a period of time sufficient for the radioactive gases evolving from the leaky fuel elements to be heated and partially accumulated in the stack 8 being checked. Thereafter, the overpressure is reduced and the pressure of the inert carrier gas is brought down to that of the coolant 9 in the stack 8, under which the level B of the coolant 9 in the tube 14 is maintained.

If the reactor 1 (FIG. 4) uses a means for circulating the coolant 9 by force (not shown), the latter starts to vigorously flow from the stack 8 into the nozzle 30 which sprays the coolant 9 in the inner space of the tube 14 below the baffle 31, the latter additionally spraying the coolant 9 into finer particles. As a result, the accumulated gases are separated from the coolant 9. The resulting mixture of the separated gases and the inert carrier gas is blown through the hollow tube 29 and the pipe 20 into the means 21 for measuring the radioactivity of said mixture, whereby leaky fuel elements in the stack 8 being checked are detected. The coolant 9 then returns to the vessel of the reactor 1 through the hole 32 in the wall of the main tube 14. The process of the heat carrier circulation from the controlled stack 8 to the nozzle 30 installed in the inner cavity of the tube 14 and then, upon dispersion, flowing into the tank of the reactor 1 through the hole 32, is the sampling from the stack to the tube 14.

To prevent the tube 14 from gripping the checked stack 8 as they are disengaged after the check is over, use is made of the additional tube 33 which is lowered, by means of the drive 34, until its bottom end touches the stack 8 to retain it in place as the tube 14 is being lifted. Then, the tube 33 is lifted by means of the drive 34 and positioned above the stack 8 so that when it is moved towards a next stack 8, it does not touch the cap 27 of the latter. The measurement of the radioactivity of the inert carrier gas together with the gases separated from the coolant 9 is effected by the means 21 after the gas mixture is fed thereinto.

The proposed method of detecting stacks with leaky fuel elements and apparatus for effecting same permit of consecutive checking of fuel element stacks in the core of a shut-down reactor using a liquid-metal coolant with the aim of detecting those with leaky fuel elements without withdrawing them from the reactor core and with subsequent removal of the faulty stacks therefrom.

The application of the proposed method and apparatus in the Soviet BN-350 and BN-600 reactors has made it possible to substantially reduce the reactor shut-down time, required to detect stacks with leaky fuel elements, and to save hunderds of thousands of roubles. In addition, the proposed apparatus is highly reliable in operation and ensures safe maintenance of the reactor.

What is claimed is:

1. A method of detecting stacks with leaky fuel elements in a liquid-metal-cooled reactor, consisting in consecutive checking of said stacks with said fuel elements by accumulating gas in the coolant of said fuel element stack being checked with the reactor being shut down, separating a sample of said coolant from the coolant in said fuel element stack being checked, separating said gases from said sample by means of an inert carrier gas, and measuring the radioactivity of said separated gases.

2. A method as claimed in claim 1, wherein, in the case of said coolant in said reactor being stationary, said accumulation of said gases in said coolant of said fuel element stack being checked is effected by bringing said reactor to steady-state conditions for a period of time corresponding to the time of convective exchange in said coolant of said fuel element stack.

3. A method as claimed in claim 1, wherein, in the case of forced circulation of said coolant in said reactor, said accumulation of said gases in said coolant of said fuel element stack being checked is effected by stopping said circulation of said coolant in said fuel element stack for a period of time limited by the time required for said fuel elements to be heated to temperatures below critical with respect to their structural and operational integrity.

4. A method as claimed in claim 3, wherein said circulation of said coolant in said fuel element stack being checked is stopped by means of the counterpressure built up by said inert carrier gas.

5. A method as claimed in claim 1, wherein said fuel element stack being checked is freed of said coolant prior to said accumulation of said gases in said coolant for a period of time determined by the afterheat of said fuel elements and the time required for their heating to temperatures below critical with respect to their structural and operational integrity, whereby said accumulation of said gases in said coolant of said fuel element stack being checked is accelerated.

6. An apparatus for detecting stacks with leaky fuel elements for a reactor provided with a recharging mechanism with a guide tube movable with the aid of a drive and two rotating plugs, one of said plugs, having at least one hole being arranged internally of the other, comprising: a hollow sampler for separating a coolant sample from the coolant in each individual fuel element stack being checked, with an inert carrier gas being fed under pressure into the inner space thereof, said coolant sample being degassed in the inner space of said sampler; a means for measuring the radioactivity of said gas separated from said sample of said coolant by means of said inert carrier gas, which means communicates with said inner space of said sampler in the direction of gas flow; said sampler being made in the form of a first tube having a plug and being arranged parallel to the axis of said reactor in said hole of said first rotating plug thereof, which tube is adapted to move along said axis of said reactor with the aid of said drive of said recharging mechanism; a sealing member for cutting off the flow of said coolant from said stack and providing for the accumulation of said gases in said coolant under the counter-pressure built up by said inert carrier gas, which sealing member is disposed in the bottom portion of said first tube which, in the course of operation of the apparatus, is under said rotating plugs; a hole for the introduction of said inert carrier gas, made in the top portion of said first tube which, in the course of operation of the apparatus, is above said rotating plugs; a hole for removing said inert carrier gas together with said gases evolved from said coolant sample, made in the top portion of said first tube which, in the course of operation of the apparatus, is above said rotating plugs; a second tube disposed internally of the first tube and having a first and a second ends; said first end of said second tube being passed through said hole for the introduction of said inert carrier gas; said second end of said second tube being in proximity to the cap of said fuel element stack below the level of said coolant in said first tube; a hole for said inert carrier gas to enter said first tube, made in direct proximity to said second end of said second tube.

7. An apparatus as claimed in claim 6, wherein said second tube is arranged coaxially with said first tube and is movable along said axis of said reactor until it butts up against said cap of said stack, thus preventing said first tube from gripping the latter as they are disengaged after the check is over.

8. An apparatus as claimed in claim 6, wherein said first tube has at least one hole for said coolant to flow from said stack being checked into the said first tube, said hole located in the wall of said first tube above said stack being checked and below the level of said coolant in said first tube.

9. An apparatus for detecting stacks with leaky fuel elements for a reactor provided with a recharging mechanism with a guide tube movable with the aid of a drive and two rotating plugs, one of said plugs, having at least one hole being arranged internally of the other, comprising: a hollow sampler for separating coolant sample from the coolant in each individual fuel element stack being checked, with an inert carrier gas being fed under pressure into the inner space thereof, said coolant sample being degassed in the inner space of said sampler; a means for measuring the radioactivity of said gas separated from said sample of said coolant by means of said inert carrier gas, which means communicates with said inner space of said sampler in the direction of gas flow; said sampler being made in the form of a first tube having a plug and being arranged parallel to the axis of said reactor in said hole of said first rotating plug thereof, which tube is adapted to move along said axis of said reactor with the aid of said drive of said recharging mechanism; a sealing member for cutting off the flow of said coolant from said stack and providing for said accumulation of said gases in said coolant under the counterpressure built up by said inert carrier gas, which sealing member is disposed in the bottom portion of said first tube which, in the course of operation of the apparatus, is under said rotating plugs; a hole for removing said inert carrier gas together with said gases evolved from said coolant sample, made in the top portion of said first tube which, in the course of operation of the apparatus, is above said rotating plugs; a second tube disposed internally of said first tube and having a first and a second ends; a third tube disposed internally of said first tube and having a first and a second ends; a nozzle disposed internally of said first tube in the bottom portion thereof so that all of said coolant from and stack being checked enters said nozzle and is sprayed above the level of said coolant in said first tube; a baffle disposed above said nozzle in the top portion of said first tube to additionally spray coolant outgoing from said nozzle, as well as to prevent said coolant from penetrating the space above said baffle and solidifying there; said first end of said second tube being coupled to said hole for the introduction of said inert carrier gas; said first end of said third tube being coupled to said hole for removing said inert gas together with said evolved gases from said first tube; said second ends of said second and third tubes being disposed below said baffle above the level of said coolant in said first tube; at least one hole for removing said coolant from said first tube made in the wall of said first tube below said nozzle above said stack.

10. An apparatus as claimed in claim 9, comprising: a fourth tube arranged internally of said hole in said first rotating plug and movable along said axis of said reactor, the bottom end of said fourth tube being disposed above said stack and below the level of said coolant in said reactor, said first tube being disposed inside said fourth tube coaxially therewith so as to prevent said first tube from gripping said stack as they are disengaged after the check is over.

* * * * *